United States Patent

[11] 3,546,383

[72] Inventor Zeno G. Lyon
Scotch Plains, New Jersey
[21] Appl. No. 742,665
[22] Filed July 5, 1968
[45] Patented Dec. 8, 1970
[73] Assignee International Telephone and Telegraph Corporation
Nutley, New Jersey
a corporation of Delaware

[54] REPEATER TERMINAL
10 Claims, 1 Drawing Fig.

[52] U.S. Cl. .......... 179/15
[51] Int. Cl. .......... H04j 1/10
[50] Field of Search .......... 179/15, 15(DC); 325/7, 9, 10, 11

[56] References Cited

UNITED STATES PATENTS 3,201,691 8/1965 Lyon .......... 325/7
3,308,379 3/1967 Leysieffer et al. .......... 325/7

*Primary Examiner*—Kathleen H. Claffy
*Assistant Examiner*—David L. Stewart
*Attorneys*—C. Cornell Remsen, Jr., Walter J. Baum, Percy P. Lantzy, Philip M. Bolton, Isidore Togut and Charles L. Johnson, Jr.

ABSTRACT: FDM channel insertion circuitry includes a mixer having an FDM channel signal including one or more blank frequency channels coupled thereto with its other input supplied by a first frequency modulated oscillator. A phase comparator is coupled to the output of the mixer having its other input coupled to a second frequency-modulated oscillator which is modulated by the channel signal or signals to be inserted in the blank channel or channels of the FDM signal. The control signal from the comparator is coupled directly to the first oscillator and through a band rejection filter to the second oscillator. The output signal from the circuitry is coupled from the output of the second oscillator or the output of the mixer.

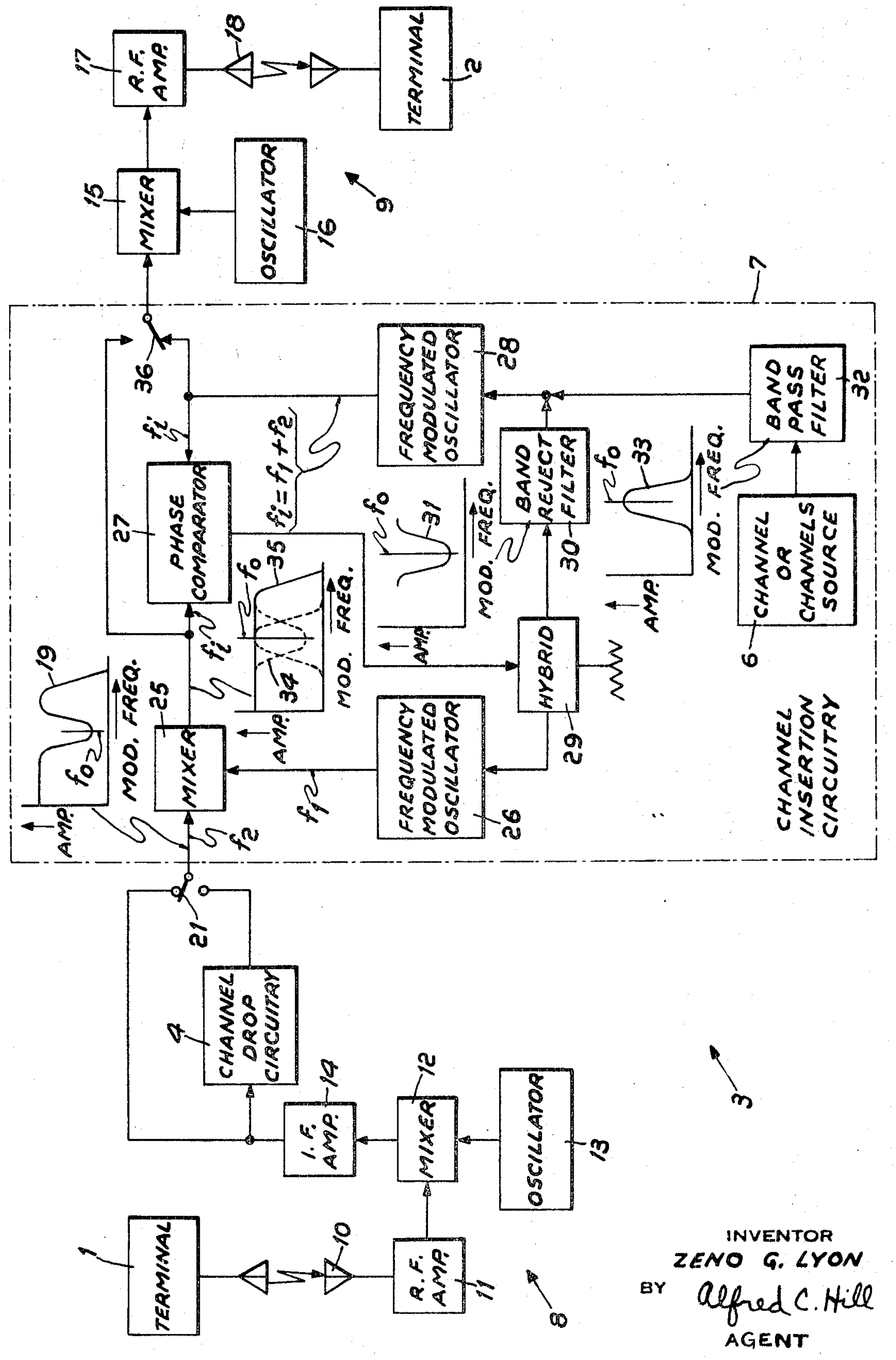
INVENTOR
ZENO G. LYON
BY Alfred C. Hill
AGENT

REPEATER TERMINAL

BACKGROUND OF THE INVENTION

This invention relates to multiplex communication system and more particularly to a repeater terminal for multiplex communication systems of the frequency division type.

Frequency division multiplex (FDM) communication systems operable over a long distance, and employing one or more repeater terminals, have in the past resulted in a prohibitive accumulation or distortion of the transmitted signal due to the repeated demodulation to baseband and remodulation from baseband at the repeater terminals. It was primarily for this reason the intermediate frequency coupled repeater terminals have been resorted to in long haul, frequency division multiplex communication systems. In this type of repeater terminal, the intermediate frequency signal of the terminal receiver is coupled directly to the intermediate frequency portion of the terminal transmitter without demodulation to baseband and remodulation from baseband. However, when the need arises for extraction or insertion of channel signals at a terminal repeater, it has been common practice to demodulate and remodulate the entire video signal with the attendant distortion. In this demodulation and remodulation process, the principle problem arises from the nonlinearity of the demodulator and the modulator. In present practice, the distortion of these components is in the order of 60 db. (decibels) as measured by noise-loading tests.

In U.S. Pat. No. 3,180,938 issued to W. L. Glomb and assigned to the same assignee as the present application, a system has been disclosed which provides drop and insert facilities and yet eliminates distortion of the signal due to the demodulating and remodulating process of the prior art arrangement. The system disclosed employs a phase detector or comparator coupled to the output of the terminal receiver, and a frequency-modulated oscillator coupled to the terminal transmitter and also to the second input of the phase comparator. The output of the phase comparator provides a signal proportional to the baseband of the received signal which is coupled to the frequency modulated oscillator for frequency control thereof in a manner to cause the output signal of the frequency-modulated oscillator to follow the input signal to the phase comparator from the terminal receiver. In the feedback loop from the output of the phase comparator to the frequency-controlled element of the frequency-modulated oscillator there is inserted a band rejection filter to pass all those channels in the baseband of the received signal other than the frequency segments or channels which are desired to be dropped at the repeater terminal. The dropped channels can be extracted from the output of the phase comparator prior to its application to the band rejection filter and the signals to be inserted in the vacated frequency segments can be inserted prior to the application of the signal to the control element of the frequency-modulated oscillator. It has been found that, while under certain circumstances the system of the above cited patent operates satisfactory, there are situations where instability can develop in the feedback circuit. This is due to the fact that the equivalent open loop phase shift of the feedback circuit from the output of the phase comparator to the input of the frequency-modulated oscillator is always a minimum of 90° lagging. The added filter, the band rejection filter, will cause instability if this filter ever produces as much as 90° lagging phase shift while the open loop gain is unity or greater. A possibility of this instability is apparent when it is considered that the filter in the feedback loop must have a large phase slope if it is to have a large amplitude slope. Thus, there are certain conditions that would cause instability in the repeater terminal arrangement of the above cited U.S. Pat.

In U.S. Pat. No. 3,201,691 issued to Z. G. Lyon and assigned to the same assignee as the present invention, a repeater terminal has been disclosed which provides drop and insert facilities retaining the advantage of the above cited U.S. Pat. No. 3,180,938, but eliminates the possibility of instability in the circuit arrangement. In the arrangement of U.S. Pat. No. 3,201,691 there are provided several alternative arrangements to overcome the instability of U.S. Pat. No. 3,180,938 which substantially includes two paths, one where the frequency channels are rejected for signal insertion and another passing the rejected signal channels. These two paths each include a frequency-modulated oscillator with the output of the two frequency-modulated oscillators being combined on a frequency basis in a mixer. The output of the mixer provided by the terminal receiver output. The frequency channels to be inserted are coupled to one of the paths of this double path system, or directly to the resultant output of one of the frequency-modulated oscillators in which the frequency channels have been rejected by the band rejection filter.

SUMMARY OF THE INVENTION

An object of the present invention is to provide channel insertion circuitry for a repeater terminal of and FDM communication system in which the advantages of U.S. Pat. No. 3,180,938 are retained and yet the disadvantages thereof are eliminated.

Another object of the present invention is to provide an alternative channel insertion circuit to those disclosed in U.S. Pat. No. 3,201,691 having the same advantages.

A feature of this invention is the provision of a repeater terminal for a frequency division multiplex communication system comprising: a first source of frequency division multiples signal having at least one blank frequency channel; a first frequency-modulated means; a second frequency-modulated means; third means coupled to the first source, the output of the first means and the output of the second means to produce a control signal; fourth means coupled to the output of the third means to couple the control signal to each of the first and second means to control the frequency thereof; a second source of at least one frequency channel signal coupled to one of the first and second means to insert the one channel signal in the blank frequency channel; and an output for the multiplex signal and the inserted signal coupled to one of the first and second means and the third means.

BRIEF DESCRIPTION OF THE DRAWING

The above-mentioned and other features and objects of this invention will become more apparent by reference to the following description taken in conjunction with the accompanying drawing, the sole FIG. of which is a block diagram of a repeater terminal incorporating the novel channel insertion circuitry in accordance with the principles of this invention.

DESCRIPTION OF THE PREFERRED EMBODIMENT

Referring to the FIG. there is illustrated therein a block diagram for a FDM communication system incorporating the channel insertion circuitry in accordance with the principles of this invention. While the description will be based upon FDM multiplex systems it is to be observed, however, that any composite signal having a multiplicity of distinct frequency segments may be operated on by the repeater terminal, and more particularly the channel insertion circuitry of this invention. The baseband signal of a FDM system is a multiplex signal having the usual characteristic for FDM arrangements, namely, a plurality of subcarrier signals separated one from the other to provide signal channels with each of the subcarrier signals being frequency modulated by intelligence to be transmitted. The baseband signal is then operated on to translate the frequency spectrum thereof to the appropriate frequency range for propagation in the communication medium. The frequency-translated baseband may be propagated by frequency modulating a radio frequency carrier. For instance, the baseband signal may be provided, which may include a blank frequency channel or channels, or may be completely loaded with frequency-modulated channels, at terminal 1 for the transmission to terminal 2 along a communication medium including therein repeater terminal 3 which in certain instances may be branch terminal repeater station transmitting and receiving intelligence signals from a propagation path which makes an angle with the propagation path between terminals 1 and 2. Repeater terminal 3 may also generate signals to enable communication between terminal 3 and terminal 2. Thus, when drop channel circuitry 4 is in operation the dropped channel or channels may be the input to the transmitter portion of a branch terminal transmitter and the channel or channels source 6 of channel insertion circuitry 7 may be the output of the receiver from the branch terminal, or it may be the locally generated source of signals which are desired to be transmitted to terminal 2.

It should be noted that the communication system outlined hereinabove is by way of example only since terminals 1 and 2 could be repeater terminals and include the same components as terminal 3. Also there could be more repeater terminals between terminal 1 and terminal 3, or terminal 3 and terminal 2. Also for the sake of simplicity of the drawing, the communication system is illustrated as being a one-way communication system. It is obvious that two way communication may be obtained between terminals 1 and 2 through terminal 3 by providing a second communication path between terminals 2 and 1 via terminal 3 with the appropriate duplication of equipment necessary to carry on this two way communication.

Turning now to the description of repeater terminal 3, receiver 8 receives the multiplex signal from terminal 1 and transmitter 9 transmits the multiplex signal from terminal 3 to terminal 2. Receiver 8 is illustrated as including antenna 10, radio frequency (RF) amplifier 11 coupled to mixer 12 which in cooperation with oscillator 13 produces an intermediate frequency (IF) version of the received RF multiplexed signal for application to IF amplifier 14. Transmitter 9 is illustrated as including mixer 15 and oscillator 16 which cooperate to raise the IF signal output of circuitry 7 to the RF region for application to RF amplifier 17 and, hence, to antenna 18 for propagation to terminal 2.

The input to circuitry 7 has the frequency modulation characteristic 19 having therein one or more frequency channels blank about a center frequency $fo$ which is modulated on the intermediate frequency carrier $f2$. Modulation frequency characteristic 19 can be achieved wherein terminal 1 transmits a loaded modulation signal, that is, all frequency channels are occupied, but there are certain channel or channels to be dropped at terminal 3. Thus, if switch 21 is moved to its other position channel drop circuitry 4 is placed in operation to drop only a channel or number of channels having a center frequency $fo$ for utilization either locally, or for application to a branch repeater transmitter. Thus, there is provided at the input to circuitry 7 an IF signal having the baseband characteristic 19. Channel drop circuitry 4 may be either of the arrangements present between dash-dot lines A–A and C–C of FIGS. 1 and 4 of the above cited U.S. Pat. No. 3,201,691.

Alternatively, characteristic 19 can be provided where terminal 1 transmits a baseband signal already including one or more blank channels about the center frequency $fo$. If this type of signal is present, switch 21 is positioned as illustrated so that the IF signal from amplifier 14 is coupled directly to the input of circuitry 7 having the baseband characteristic 19.

Circuitry 7 includes mixer 25 coupled to the output of switch 21 for receipt of the baseband signal carried by frequency $f2$ having modulation characteristics 19. The other input of mixer 25 is provided by frequency modulated oscillator 26 having a center frequency $f1$. The output from mixer 25 having an IF frequency $fi = f1 + f2$ (the upper sideband signal output) is then coupled to phase comparator 27 which receives its other input from frequency modulated oscillator 28. The nominal or center frequency output signal of oscillator 28 is $fi = f1 + f2$. It should be noted at this point that $fi$ could just as well be equal to $f1 - f2$, the lower sideband output signal of mixer 25. Phase comparator 27 provides an error signal which actually is the baseband signal of the terminal, the FDM input having characteristic 19 and the signals inserted in the blank channel or channels thereof. This control signal is coupled to a power divider, such as hybrid 29, so that the modulation or baseband signal can be coupled directly to oscillator 26 for frequency modulation thereof and through band rejection filter 30 having a characteristic 31 to reject any signal that may be in the vacant channel or channels of the characteristic to oscillator 28 for frequency modulation thereof. The signal from source 6 is to be inserted in the blank channel or channels of the IF signal input to mixer 25. The signal output from source 6 is coupled through bandpass filter 32 having a characteristic 33 complementary to the characteristic 31 of band reject filter 30. The output of filter 32 is then coupled to oscillator 28 for frequency modulation thereof to fill the blank channel or channels that were in the baseband signal at the input of mixer 25.

The operation of the channel insertion circuitry 7 may be described as follows. With a lack of output from source 6 stability of the phase-locked loop is maintained even though band reject filter 30 is coupled from hybrid 29 to the input of oscillator 28, since the control signal from phase comparator 27 frequency modulates oscillator 26 and has a characteristic at its output such that the baseband characteristic of $fi$ at the output of mixer 25 is as is shown in dotted portion 34 of characteristic 35. Thus, similar inputs will be provided to phase comparator 27 and the system will maintain its stability since the band reject filter does not play a part in maintaining a phase-locked condition and there is no energy in the vacant channels due to the absence of output from source 6. When there is an input from source 6 frequency modulated oscillator 28 will be frequency modulated in the blank channel or channels and will provide an input to comparator 27 which when compared with the output of mixer 25 will produce a baseband signal having energy in the vacant channel or channels of the characteristic 19. This control signal is then coupled to hybrid 29 which has one output coupled to band reject filter 30 to remove modulation in the blank channels so that new intelligence signals may be inserted therein from source 6. Additionally, the fully modulated baseband signal frequency modulates oscillator 26 which provides at the output of mixer 25 a full modulation signal as illustrated by characteristic 35. This is substantially identical to the output from oscillator 28, the condition necessary for phase lock, and the phase locked loop will be in a proper locked condition so that the output of oscillator 28 will follow the input to mixer 25 with the additional information from source 6.

The baseband signal including the original frequency multiplex signal applied to mixer 25 and the inserted signals at the output of oscillator 28 may be coupled to mixer 15 through switch 36 when in the position illustrated. Also the same baseband signal is present at the output of mixer 25. Thus, if switch 36 is placed in its other position the input to mixer 15 will be from the output of mixer 25.

To summarize, the error signal at the output of comparator 27 represents the frequency discrepancy and the distortion of the two frequency signals applied thereto which is fed back to oscillator 26 directly from hybrid 29 and to oscillator 28 through filter 30 to correct the distortion and to provide a signal capable of modulating the transmitter, namely, the baseband signal including the multiplex signal input applied to mixer 29 having characteristic 19 and the inserted signals applied from source 6 to oscillator 28. With this arrangement the system functions essentially as a directly coupled IF repeater since the transmitter IF carrier is corrected in frequency deviation and distortion to agree with the receiver IF carrier and in addition provides the desired channel insertion to fill the blanks of the receiver IF carrier.

The repeater terminal arrangement described hereinabove has the advantage of being physically simple and economical in that the demodulators and modulators at baseband level are eliminated and, in addition, has the advantage of being virtually distortionless. The fact that the repeater terminal of this invention is distortionless is because the nonlinearity of the modulation characteristic of the frequency modulated oscillators is reduced by the two loop paths and the loop gain of the phase or frequency comparison circuit. Moreover, due to the complementary characteristics of the bandpass and band rejection filters and, since the full baseband signal is utilized for comparison purposes, a very high loop gain can be employed without instability.

While I have described above the principles of my invention in connection with specific apparatus, it is to be clearly understood that this description is made only by way of example and not as a limitation to the scope of my invention as set forth in the objects thereof and the accompanying claims.

I claim:

1. A repeater terminal for a frequency division multiplex communication system comprising:
a first source of frequency division multiplex signal having at least one blank frequency channel;
a first frequency-modulated means;
a second frequency-modulated means;
third means coupled to said first source, the output of said first means, and the output of said second means to heterodyne said signal of said first source and the output signal of one of said first and second means and to compare the phase of the signal resulting from the heterodyned signals and the output signal of the other of said first and second means to produce a control signal;
fourth means coupled to the output of said third means to couple said control signal to each of said first and second means to control the frequency thereof;
a second source of at least one frequency channel signal coupled to one of said first and second means to insert said one channel signal in said blank frequency channel; and
an output for said multiplex signal and said inserted signal coupled to one of said first and second means and said third means.

2. A terminal according to claim 1, wherein each of said first and second means includes a frequency-modulated oscillator.

3. A terminal according to claim 1, wherein said third means includes:
a mixer coupled to said first course and the output of one of said first and second means; and
a phase comparator coupled to the output of said mixer and the output of the other of said first and second means.

4. A terminal according to claim 3, wherein said output is coupled to the output of said mixer.

5. A terminal according to claim 3, wherein said output is coupled to the output of said other of said first and second means.

6. A terminal according to claim 1, wherein said fourth means includes:
filter means to reject signals in said blank frequency channel, coupled to the input of one of said first and second means; and
fifth means to couple said control signal to the other of said first and second means and said filter means.

7. A terminal according to claim 1, wherein said first source includes fifth means to receive said multiplex signal having said one blank frequency channel from a preceding terminal of said communication system.

8. A terminal according to claim 1, wherein said first source includes:
fifth means to receive a multiplex signal having all frequency channels carrying intelligence signal from a preceding terminal of said communication system; and
sixth means coupled to said fifth means to remove at least one frequency channel from said received multiplex signal and recover the intelligence signal of said removed frequency channel for utilization at said repeater terminal.

9. A terminal according to claim 1, wherein:
said first means includes a first frequency modulated oscillator;
said second means includes a second frequency modulated oscillator;
said third means includes:
a mixer coupled to said first source and the output of said first oscillator; and
a phase comparator coupled to the output of said mixer and the output of said second oscillator;
said fourth means includes:
filter means to reject signals in said blank frequency channel coupled to the input of said second oscillator; and
fifth means to couple said control signal to said first oscillator and said filter means; and
said output is coupled to the output of said mixer.

10. A terminal according to claim 1, wherein:
said first means includes a first frequency modulated oscillator;
said second means includes a second frequency modulated oscillator;
said third means includes:
a mixer coupled to said first source and the output of said first oscillator; and
a phase comparator coupled to the output of said mixer and the output of said second oscillator;
said fourth means includes:
filter means to reject signals in said blank frequency channel coupled to the input of said second oscillator; and
fifth means to couple said control signal to said first oscillator and said filter means; and
said output is coupled to the output of said second oscillator.